(12) United States Patent
Krieser (10) Patent No.: US 12,004,479 B2
(45) Date of Patent: *Jun. 11, 2024

(54) PET LITTER SYSTEMS AND METHODS OF SERVICING

(71) Applicant: Alison Krieser, Dallas, TX (US)

(72) Inventor: Alison Krieser, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,354

(22) Filed: Feb. 14, 2022

(65) Prior Publication Data

US 2022/0159924 A1 May 26, 2022

Related U.S. Application Data (63) Continuation of application No. 16/748,437, filed on Jan. 21, 2020, now Pat. No. 11,246,284.

(51) Int. Cl.
*A01K 1/01* (2006.01)
(52) U.S. Cl.
CPC .................... *A01K 1/011* (2013.01)
(58) Field of Classification Search
CPC ......... A01K 1/0107; A01K 1/01; A01K 1/011
USPC ....................................................... 119/165
See application file for complete search history.

(56) References Cited

U.S. PATENT DOCUMENTS

| | | | |
|---|---|---|---|
| 3,831,557 A * | 8/1974 | Elesh | A01K 1/0107 119/170 |
| 4,279,217 A * | 7/1981 | Behringer | A01K 1/0107 383/77 |
| 4,348,982 A * | 9/1982 | Selby | A01K 1/0125 220/8 |
| 4,627,381 A * | 12/1986 | Reed | A01K 1/0107 119/165 |
| 4,627,382 A | 12/1986 | Muzzey | |
| 4,763,603 A | 8/1988 | Coes | |
| 4,838,202 A * | 6/1989 | Neu | A01K 1/0107 119/165 |
| 4,858,559 A | 8/1989 | Allen | |
| 4,872,420 A | 10/1989 | Shepard | |
| 4,913,091 A | 4/1990 | O'Connor | |
| 4,932,360 A | 6/1990 | O'Connor | |
| 4,981,104 A | 1/1991 | Goodwin | |
| 5,027,748 A | 7/1991 | Wolak | |
| 5,031,578 A | 7/1991 | Hammons et al. | |
| 5,035,205 A | 7/1991 | Schiller et al. | |
| 5,038,721 A | 8/1991 | Ouellette et al. | |

(Continued)

FOREIGN PATENT DOCUMENTS

GB 1452312 10/1976

*Primary Examiner* — Yvonne R Abbott-Lewis
(74) *Attorney, Agent, or Firm* — Resolute Legal PLLC (57) ABSTRACT

Pet litter systems and methods for sanitary servicing are disclosed. In some implementations, a pet litter system may comprise a bottom housing, a disposable inner box which may receive pet litter and pet waste, a service gap, and a safety liner which may be positioned in between the bottom housing and the disposable inner box, wherein the safety liner may protect interior surfaces of the bottom housing from contamination. In some implementations, a safety liner may be closable and usable as a disposal bag to seal contents comprising a disposable inner box, pet litter and pet waste therein, and may be safely removed from a bottom housing of a pet litter system and surrounding areas by a servicer of the pet litter system for disposal.

15 Claims, 6 Drawing Sheets

(56) References Cited

U.S. PATENT DOCUMENTS

| | | | |
|---|---|---|---|
| 5,178,100 A | 1/1993 | Monk | |
| 5,488,929 A | 2/1996 | Pierson et al. | |
| 5,758,601 A | 6/1998 | Dickson | |
| 5,850,798 A * | 12/1998 | Engel | A01K 1/0107 |
| | | | 119/170 |
| 6,135,057 A | 10/2000 | Cummings | |
| 6,286,457 B1 | 9/2001 | Sugahara | |
| 10,440,933 B1 * | 10/2019 | Saylor | A01K 1/0157 |
| 2004/0083981 A1 | 5/2004 | Nye et al. | |
| 2007/0266953 A1 * | 11/2007 | Zoller | A01K 1/0125 |
| | | | 119/169 |
| 2008/0083377 A1 | 4/2008 | Hurwitz | |
| 2009/0241851 A1 | 10/2009 | Peddycoart | |
| 2012/0186527 A1 | 7/2012 | Noonan | |
| 2012/0255497 A1 * | 10/2012 | Simon | A01K 1/0152 |
| | | | 206/427 |
| 2014/0138966 A1 | 5/2014 | Ferguson | |
| 2018/0110199 A1 | 4/2018 | Venezio | |
| 2018/0193002 A1 | 7/2018 | Langefels | |
| 2018/0199536 A1 * | 7/2018 | Torralbas | A01K 1/011 |
| 2019/0133071 A1 * | 5/2019 | Johnes | B65D 33/28 |
| 2021/0037781 A1 | 2/2021 | Klatt | |
| 2021/0219517 A1 * | 7/2021 | Krieser | A01K 1/0107 |

\* cited by examiner

PET LITTER SYSTEMS AND METHODS OF SERVICING

CROSS REFERENCE TO RELATED APPLICATION

This application is a continuation of U.S. application Ser. No. 16/748,437, filed Jan. 21, 2020, the contents of which are hereby incorporated by reference.

FIELD OF THE DISCLOSURE

The present disclosure relates to pet litter systems and methods of servicing.

SUMMARY

Various implementations of pet litter systems and various methods for sanitary servicing and maintenance thereof are disclosed. In some implementations, the pet litter system allows for a sanitary collection and disposal of pet waste and one or more soiled system components. A pet litter system may comprise an outer box, a disposable inner box configured to receive pet litter, and a liner (also referred to herein as a safety liner), wherein the outer box may comprise a bottom housing forming an open-top outer box and, in some implementations, may optionally comprise a top housing which forms a top enclosure for the bottom housing, thereby in some implementations, forming a generally closed top outer box or a generally closed pet litter system excluding an entryway provided for pet access to the pet litter system. In some implementations, a top edge of an enclosing wall of the bottom housing is higher (e.g., taller) than a top edge of a wall (also referred to herein as an inner wall) of the disposable inner box and thereby may contain pet litter and pet waste that is excreted or otherwise kicked (knocked, etc.) outward from the disposable inner box.

In some implementations the liner is a safety liner and protects and seals interior surfaces of the outer box from contamination from pet waste and soiled pet litter. A disposable inner box may receive pet litter and may be used by a pet to dispose pet waste therein and may provide a separation between the pet and the safety liner, thereby protecting the safety liner from damage and maintaining a sealing integrity of the safety liner. Pet litter disposed in a disposable inner box may be serviced by a servicer of a pet litter system (such as a pet owner) to scoop pet waste and the disposable inner box may provide a separation between the scoop and the safety liner, thereby protecting the safety liner from damage and maintaining a sealing integrity of the safety liner.

In some implementations, a bottom housing and disposable inner box may be configured to provide a service gap therebetween. A gap size of a service gap may be defined as a distance between an outer surface of an inner wall of a disposable inner box and an inner surface of a safety liner covering an enclosing wall of a bottom housing when measured horizontally at the top edge of the inner wall of the inner box. As used herein, a reference to a single dimension in conjunction with a service gap wherein no other context to an application of the referenced dimension is stated may be taken to specifically mean a gap size of the service gap. For example, "a service gap of one-half inch" means "the gap size of the service gap is one-half inch". In some implementations, a gap size of a service gap may be configured to enable a servicer of a pet litter system to dispose pet litter into the service gap, wherein the disposed pet litter may assist in conforming or anchoring a safety liner to interior surfaces of the bottom housing and/or may receive pet waste which may be excreted or otherwise kicked (knocked, etc.) from a disposable inner box, or may be otherwise disposed within the service gap (e.g., scooped thereto), thereby controlling odor. In some implementations, a gap size of a service gap may be configured to enable a servicer of a pet litter system (such as a pet owner) to scoop pet waste from a disposable inner box of the pet litter system and dispose the scooped pet waste into the service gap and to optionally dispose pet litter into the service gap to cover the pet waste disposed therein to control odor, thereby extending a service life of the disposable inner box and of pet litter within the pet litter system.

In some implementations, an upper portion of a safety liner may be configured such that it is not prone to contamination by pet waste and soiled litter (e.g., may be positioned outside of a perimeter of a bottom housing) and may be safely used by a servicer of a pet litter system to safely remove and dispose of the safety liner which may comprise a disposable inner box, pet litter and pet waste disposed therein. In some implementations, a top housing may be used in combination with a bottom housing such that an upper portion of a safety liner may pass in between the bottom housing and top housing and be protected from contamination by pet waste and soiled litter disposed within the bottom housing and top housing, and the upper portion of the safety liner may be safely used by a servicer of a pet litter system to safely remove and dispose of the safety liner which may comprise a disposable inner box, pet litter, and pet waste disposed therein. In some implementations, a safety liner may be configured to be used as a disposal bag, and the disposal bag may be closable, thereby sealing contents inside the disposal bag, wherein such contents may include a disposable inner box, pet litter, and pet waste, and the disposal bag and its contents may be safely removed from a bottom housing of a pet litter system and surrounding areas by a servicer of a pet litter system for disposal thereof. In some implementations, an upper portion of a safety liner may comprise a draw string and the draw string may be usable to close and seal the safety liner. In some implementations, an upper portion of a safety liner may be usable by a servicer of a pet litter system to assist in positioning and/or securing the safety liner to a bottom housing.

In some implementations, a bottom housing of an outer box of a pet litter system may be configured to comprise a tall enclosing wall(s), such that a safety liner may cover interior surfaces of the bottom housing and an upper portion of the safety liner may be positioned outside of a perimeter top edge of the tall enclosing wall. A pet having controlled waste excretions may use the pet litter system to dispose pet waste therein, and such pet may not be prone to excrete waste on the uppermost portions of the tall enclosing wall, its covering safety liner, and/or outside of the bottom housing. In such implementations, the pet litter system described herein accommodates sanitary servicing of the pet litter system by a servicer.

In some implementations, a pet litter system may comprise a top housing and a bottom housing on which the top housing may be positioned. In some implementations, the bottom housing may be configured to comprise a tall enclosing wall(s), such that a safety liner may cover interior surfaces of the bottom housing and an upper portion of the safety liner may be positioned outside of a perimeter top edge of the tall enclosing wall. As can be appreciated, a pet having poorly controlled waste excretions (such as an elderly and/or sick pet) may be prone to excrete or "spray"

waste material uncontrollably. Such pets may use the pet litter system described herein to excrete pet waste therein and may be prone to excrete waste on the uppermost portions of the tall enclosing wall, its covering safety liner and/or surfaces of a top housing. In such implementations, the pet litter system described herein accommodates sanitary servicing of the pet litter system by a servicer.

In some implementations, a servicer of a pet litter system may prepare the pet litter system for use by: 1) installing a safety liner in a bottom housing, wherein an upper portion of the safety liner is configured such that it is not prone to contamination by pet waste and soiled litter (e.g., may be positioned outside of the perimeter of the bottom housing); 2) installing a disposable inner box within the bottom housing and on top of the safety liner, such that the safety liner separates interior surfaces of the bottom housing from the disposable inner box, and the disposable inner box and bottom housing may comprise a service gap; 3) disposing pet litter in the disposable inner box (or the disposable inner box may be prefilled with pet litter), wherein a pet using the pet litter to dispose waste therein is separated from the safety liner by the disposable inner box; and 4) optionally installing, an optional top housing on top of the bottom housing forming an optional top enclosure for the bottom housing, wherein an upper portion of the safety liner may pass in between the bottom housing and the optional top housing and be protected from contamination by pet waste and soiled litter disposed within the bottom housing and the optional top housing.

In some implementations, a servicer of a pet litter system may extend a service life of pet litter within the pet litter system by: 1) removing, if installed, an optional top housing optionally installed on top of the bottom housing; 2) scooping pet waste which may be present from pet litter within a disposable inner box, wherein the scooped pet waste may be removed from the pet litter system for disposal, or may be disposed in a service gap, if present, and a gap size of a present service gap is of a large enough size to accommodate the scooped pet waste 3) if a service gap is present and pet waste is disposed therein, optionally disposing pet litter in the service gap to cover the pet waste disposed therein, thereby controlling odor; and 4) replacing if present, a removed optional top housing, wherein an upper portion of a safety liner may pass in between the bottom housing and the optional top housing and be protected from contamination by pet waste and soiled litter disposed within the bottom housing and the optional top housing.

In some implementations, a servicer of a pet litter system may service the pet litter system to quickly remove all pet litter, all pet waste and all soiled system components therein for disposal, thereby quickly and fully removing all sources of odor, and then prepare the pet litter system for subsequent use by: 1) removing, if installed, an optional top housing optionally installed on top of the bottom housing; 2) grasping an upper portion of a safety liner configured such that it is not prone to contamination by pet waste and soiled litter (e.g., may be positioned outside of the perimeter of the bottom housing); 3) closing and sealing the safety liner, wherein the safety liner is configured to be used as a disposal bag, thereby sealing contents therein, and wherein such contents may include a disposable inner box, pet litter and pet waste; 4) safely removing the disposal bag (e.g., closed safety liner) and its contents for disposal thereof 5) installing a safety liner in the bottom housing, wherein an upper portion of the safety liner is configured such that it is not prone to contamination by pet waste and soiled litter (e.g., may be positioned outside of the perimeter of the bottom housing); 6) installing a disposable inner box within the bottom housing and on top of the safety liner, such that the safety liner separates interior surfaces of the bottom housing from the disposable inner box, and in some implementations, the disposable inner box and bottom housing may be aligned in a manner to create a service gap; 7) disposing pet litter in the disposable inner box (or the disposable inner box may be prefilled with pet litter), wherein a pet using the pet litter to dispose waste therein is separated from the safety liner by the disposable inner box; and 8) replacing if present, a removed optional top housing, wherein an upper portion of a safety liner may pass in between the bottom housing and the optional top housing and be protected from contamination by pet waste and soiled litter disposed within the bottom housing and the optional top housing.

In some implementations, a safety liner and a disposable inner box may be sold as accessories to service and maintain a pet litter system. In some implementations, a safety liner and a disposable inner box may attached together and be configured to be installed in a bottom housing as a service unit, wherein the safety liner may be properly positioned to cover the interior surfaces of the bottom housing and the disposable inner box attached thereto is thereby properly located within the bottom housing. In some implementations, the service unit may be sold as an accessory to service and maintain a pet litter system. In some implementations, a safety liner, disposable inner box and pet litter may be prepackaged as a prepackaged service unit. In some implementations, a prepackaged service unit may comprise surplus pet litter to dispose into a service gap. In some implementations a prepackaged service unit may be sold as an accessory to service and maintain a pet litter system. In some implementations, the accessory safety liners, accessory disposable inner boxes, and pet litter may be separately sold. In some implementations, accessory safety liners, accessory disposable inner boxes, accessory service units and/or accessory prepackaged service units may be provided as part of a paid subscription service.

BRIEF DESCRIPTION THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of the disclosed subject matter.

DETAILED DESCRIPTION

Various detailed example implementations of a pet litter system are disclosed herein; however, it is to be understood that the disclosed implementations are merely illustrative and may be embodied in various forms. In addition, each of the examples given in connection with the various implementations is intended to be illustrative, and not restrictive.

The following detailed example implementations refer to the accompanying drawings. The same reference number may appear in multiple drawings and when appearing in multiple drawings will identify the same or similar elements.

Figure 1A:
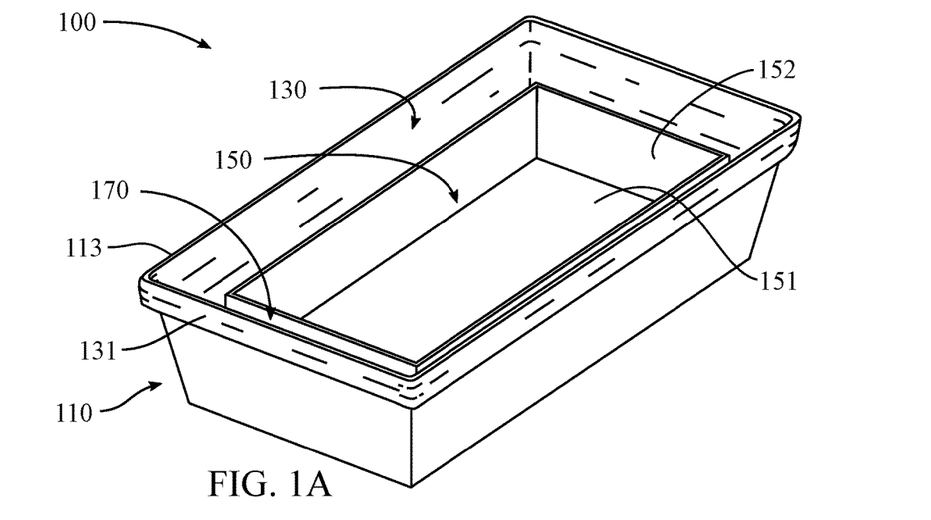
FIG. 1A depicts a perspective view of an example implementation of a pet litter system.

FIG. 1A depicts a perspective view of an example implementation of a pet litter system 100. In some implementations, pet litter system 100 may comprise an outer box comprising a bottom housing 110, a safety liner 130 and a disposable inner box 150 comprising a floor 151 and an inner wall(s) 152 within which pet litter and pet waste may be disposed. In some implementations, safety liner 130 may be comprised of a flexible, thin sheet material, such as by way of an example, a thin plastic material which may be commonly used in disposable trash bags, and may be by way of example, material used in biodegradable and/or compostable trash bags. Safety liner 130 may cover interior surfaces of bottom housing 110, wherein bottom housing 110 may in turn provide a rigid and/or semi rigid support for safety liner 130. Safety liner 130 may be configured to line and protect interior surfaces of bottom housing 110 from contamination and soiling from pet waste and soiled pet litter. In some implementations, safety liner 130 may comprise an upper portion 131 which may pass over a perimeter top edge 113 of bottom housing 110 and around the exterior thereof such that upper portion 131 is not prone to contamination by pet waste and soiled litter. In some implementations, upper portion 131 may assist in securing safety liner 130 to bottom housing 110. In some implementations, safety liner 130 may be usable as a disposal bag, wherein upper portion 131 may form an upper portion of the disposal bag, and due to its position on an exterior surface of bottom housing 110, may be free of contamination by pet waste and soiled litter such that it may be safely grasped by a servicer of pet litter system 100 to close and seal the disposal bag formed by safety liner 130 and dispose of pet litter, pet waste and a potentially soiled disposable inner box 150. In some implementations, disposable inner box 150 may be positioned on an upper surface of safety liner 130 and, as such, safety liner 130 may be situated in between disposable inner box 150 and bottom housing 110, which may thereby further secure safety liner 130 to bottom housing 110. In some implementations, disposable inner box 150 may receive pet litter which may in turn receive pet waste from a pet using pet litter system 100 to dispose of waste therein. In some implementations, disposable inner box 150 may provide a separation between a pet using pet litter received by disposable inner box 150 and safety liner 130, and may thereby prevent damage to safety liner 130 in its protected position between disposable inner box 150 and bottom housing 110, such that a sealing integrity of safety liner 130 may be maintained.

In some implementations, top edge 113 of an enclosing wall of bottom housing 110 is higher than a top edge of an inner wall of disposable inner box 150 and thereby may contain pet litter and pet waste that is expelled or otherwise kicked (knocked, etc.) outward from the disposable inner box. In some implementations, pet litter system 100 may comprise a service gap 170 between a safety liner 130 covering surfaces of bottom housing 110 and a disposable inner box 150 (e.g., an area of base 111 of bottom housing 110 is greater than an area of a floor 151 of a disposable inner box 150 thereby creating a service gap 170; wall 112 extends upwardly from base 111 at an outward angle from vertical: See FIG. 4B) The gap size of a service gap 170 may be defined as the distance between inner wall 152 and an adjacent wall of bottom housing 110 (less the thickness of a covering safety liner) when measured horizontally at the top of inner wall 152, and a reference to a single dimension in conjunction with a service gap wherein no other context to an application of the referenced dimension is stated may be taken to specifically mean a gap size of the service gap. For example, "a service gap of one-half inch" means "the gap size of the service gap is one-half inch". In some implementations, service gap 170 may extend the perimeter of disposable inner box 150 and may serve to create a separation between a pet using litter received by disposable inner box 150 and safety liner 130, and may thereby prevent damage to safety liner 130 in exposed surfaces (e.g., surfaces not covered by disposable inner box 150), such as on upper interior surfaces of bottom housing 110. In some implementations, a gap size of service gap 170 may be less than about one and one-half inches. In some implementations, a gap size of service gap 170 may be in a range of equal to or greater than one and one-half inches and less than about four inches. In some implementations, a gap size of service gap 170 may be equal to or exceed about four inches. In some implementations, service gap 170 may be of a sufficient gap size to receive pet litter when scooped therein, such as for example, greater than or equal to about one and one-half inches. It should be appreciated that the service gap may be any suitable dimension. In some implementations, pet litter disposed in the service gap may receive pet waste entering service gap 170. As can be appreciated, any pet waste entering service gap 170 may be at least partially absorbed and odor thereof controlled by pet litter disposed therein. In some implementations, pet litter disposed in service gap 170 may serve to apply pressure (due to its weight) and assist in anchoring and conforming a flexible safety liner 130 to maintain a contact and/or a close proximity to interior surfaces of bottom housing 110.

In some implementations, a gap size of service gap 170 may be of a dimension which may permit a servicer of pet litter system 100 to scoop pet waste from disposable inner box 150 and dispose the pet waste into service gap 170, such that the service life of pet litter received in disposable inner box 150 may potentially be extended. Furthermore, pet waste so disposed in service gap 170 may be covered with pet litter to control odors, wherein such controlling may potentially extend the service life of litter received in disposable inner box 150. In some implementations, a gap size of service gap 170 may be of a dimension which may not entice pets to intentionally use the service gap to dispose waste therein, such as less than four inches. However, it should be appreciated that in some implementations, a gap size of service gap 170 may be greater than four inches.

Figures 1B, 1C, 1D, 1E:
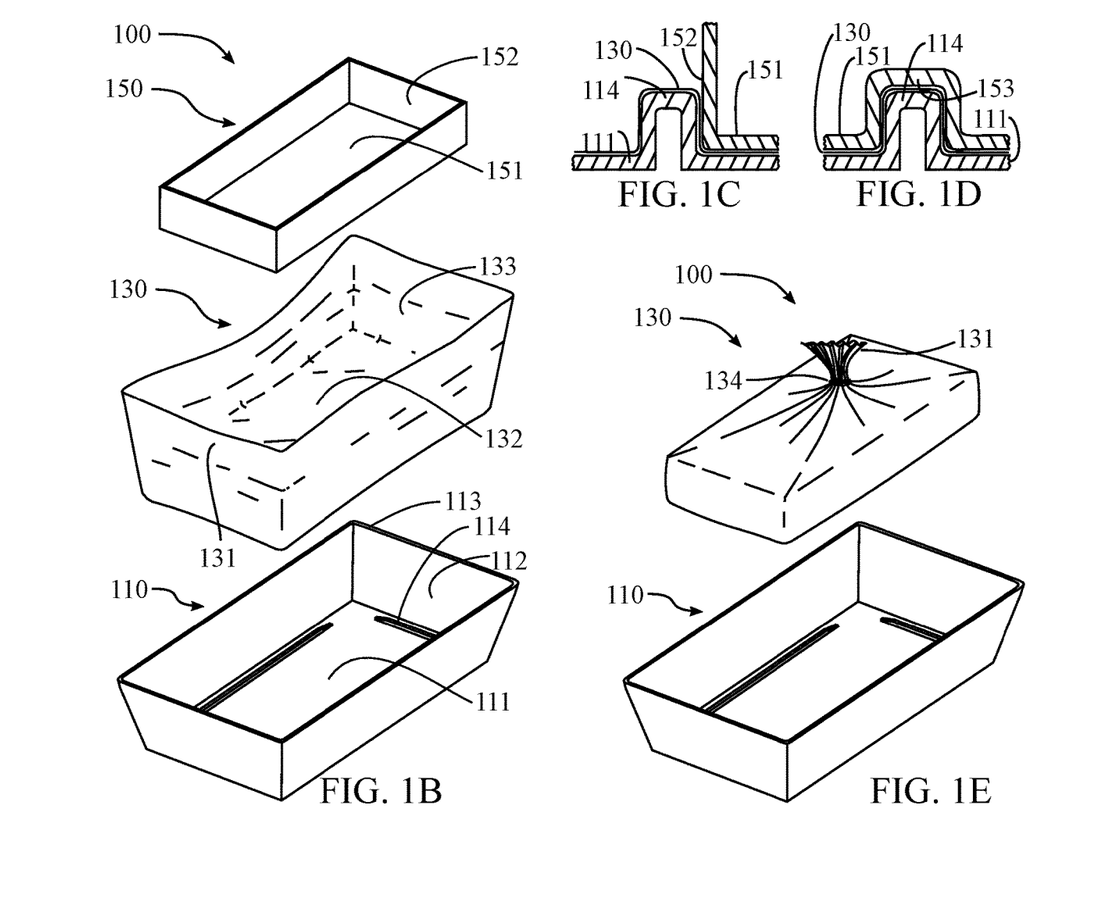
FIG. 1B depicts an exploded perspective view of the pet litter system of FIG. 1A.
FIG. 1C depicts a cross section of an implementation of a placement ridge feature.
FIG. 1D depicts a cross section of an implementation of a placement ridge feature.
FIG. 1E depicts an exploded perspective view of the pet litter system of FIG. 1A and FIG. 1B.

FIG. 1B depicts an exploded perspective view of pet litter system 100 of FIG. 1A. Bottom housing 110 may comprise a base 111 and an enclosing wall(s) 112 forming an open-top box and may serve as an outer box of an assembled pet litter system 100 comprising a disposable inner box 150 which may serve as an inner box. Enclosing wall(s) 112 comprises a top edge 113. In some implementations, bottom housing 110 may comprise one or more location features 114 (described more fully hereinbelow) configured to locate and maintain a position of disposable inner box 150 in a predetermined location (or range of locations) within bottom housing 110. In the example implementation of FIG. 1B, location features 114 comprise four ridges (only two are visible in FIG. 1B) protruding upward from base 111, wherein location features 114 may confine disposable inner box 150 within a boundary established by location features 114. A spacing(s) between location features 114 in the example implementation of FIG. 1B may be such that disposable inner box 150 and thicknesses of safety liner 130 (described more fully hereinbelow) may fit within the boundary determined by the spacing(s). In some implementations, location features 114 may comprise rounded edges to prevent stresses which may puncture safety liner 130.

FIG. 1C depicts a cross section of an implementation of a location feature 114 protruding upward from a base 111 and forming a ridge comprising rounded edges, wherein both base 111 and location feature 114 are covered by a safety liner 130. An inner wall 152 and a floor 151 of a disposable inner box 150 may abut location feature 114 (and covering safety liner) such that location feature 114 establishes a boundary constraint of disposable inner box 150. In some implementations, location features 114 of base 111 may reside within one or more boundaries of a disposable inner box 150 disposed in bottom housing 110. In some implementations, placement features 114 establish a location constraint of a disposable inner box 150 within bottom housing 110 to assist service providers with proper alignment of disposable inner box 150 to maintain a desired service gap 170. It should be appreciated that although four lengths of ridges of location features 114 are contemplated in one implementation, in other implementations greater or fewer location features 114 may be utilized. In some implementations, location features 114 may additionally extend from base 111 around one or more outside corners (not shown) of disposable inner box 150. In some implementations, location features may only extend from base 111 around one or more outside corners (not shown) of disposable inner box 150. In some implementations, any suitable arrangement of location features 114 may be disposed so as to allow for proper alignment of disposable inner box 150 in relation to base 111 of bottom housing 110 so as to create the desired service gap 170 within pet litter system 100.

FIG. 1D depicts an alternative implementation of location feature 114. FIG. 1D shows a cross section of a location feature 114 protruding upward from a base 111 and cooperating with a placement feature 153, wherein both base 111 and location feature 114 are covered by a safety liner 130 and location feature 114 and placement feature 153 may be mating features and may have rounded edges. Location feature 114 may be a ridge and may protrude into a mating groove placement feature 153 inset into a floor 151 of a disposable inner box 150, and thereby may establish a location constraint of a disposable inner box 150 within a bottom housing 110. That is, in some implementations, rather than placing location features 114 around the outer periphery of disposable inner box 150 when inner box 150 is placed upon base 111, location features 114 may be disposed in both structures 111 and 150 so as to cooperate and provide proper alignment between disposable inner box 150 and base 111. In such implementations, it should be appreciated that any suitable shape, size, and disposition of a coordinating location feature 114 of base 111 and mating groove placement feature 153 of floor 151 of disposable inner box 150 may be utilized provided that sufficient alignment between base 111 and disposable inner box 150 is achieved to assist service providers with proper alignment of disposable inner box 150 to maintain a desired service gap 170.

In various implementations, the perimeter of base 111 may be of various shapes, such as for example, a rectangle (as depicted in FIG. 1A and FIG. 1B), an oval, an ellipse, a square, and the like, and enclosing wall 112 may follow the perimeter shape of base 111. In some implementations, top edge 113 and enclosing wall 112 may slope outward from a center region of bottom housing 110. In some implementations, an outward sloping enclosing wall 112 when positioned adjacent to a vertical inner wall 152 may provide a service gap 170 based on a degree of slope and a height of the walls, even where an inner dimension of base 111 and an outer dimension of floor 151 are substantially the same (excluding thicknesses of safety liner 130). In some such implementations, a gap size of a service gap 170 for a flat vertical inner wall 152 and a flat outwardly sloping enclosing wall 112 may be calculated as the distance between the outer dimension of floor 151 and the inner dimension of base 112, plus the height of inner wall 152 multiplied by the cosine of the outward slope of the of enclosing wall 112 (where a vertical wall is at 90 degrees slope and an outward slope is less than 90 degrees), minus the thickness of safety liner 130. In some implementations, an outward sloping enclosing wall 112 of a bottom housing 110 may provide for a relatively unobstructed removal of a safety liner 130 including a disposable inner box 150 in the presence of litter and waste which may be present within a service gap 170 between inner box 150 and bottom housing 110.

Bottom housing 110 may be rigid or semi-rigid and may be manufactured using various materials and processes. For example, in some implementations, bottom housing 110 may be made of plastics using a thermal forming process, such as for example, an injection molding process or a thermoforming process, and various plastic materials, thicknesses and other geometries may be used and may comprise various rigidities. In some implementations, metals, woods, chips, fibers, resins, epoxies, glues, composite materials and/or other suitable materials may be used. In some implementations ceramics and glass may be used, however caution against breakage and potential injuries resulting from sharp edges should be observed.

As noted earlier, in some implementations, safety liner 130 may be comprised of a flexible, thin sheet material, such as by way of an example, a thin plastic material which may be commonly used in disposable trash bags, and may be by way of example, material used in biodegradable and/or compostable trash bags. Safety liner 130 may be folded to be packaged, stored, shipped and the like prior to being assembled and put into service. Safety liner 130 is depicted unfolded in FIG. 1B as may be done prior to installation and FIG. 1B may depict safety liner 130 in an example orientation prior to placement into bottom housing 110. As noted earlier, in some implementations, safety liner 130 may comprise an upper portion 131 which may pass over a perimeter top edge 113 of enclosing wall 112 of bottom housing 110 and around the exterior thereof such that upper portion 131 is not prone to contamination by pet waste and soiled litter, and where upper portion 131 may assist in securing safety liner 130 to bottom housing 110. In some implementations, safety liner 130 may be configured to be usable as a disposal bag, wherein upper portion 131 may form an upper portion of the disposal bag, and due to its position on an exterior surface of bottom housing 110, may be free of contamination by pet waste and soiled litter such that it may be safely grasped by a servicer of pet litter system 100 to close and seal the disposal bag formed by safety liner 130 and dispose of pet litter, pet waste and a potentially soiled disposable inner box 150. Safety liner 130 may comprise a compliant floor 132 and a compliant wall(s) 133 which may conform to the surfaces of base 111 and enclosing wall 112, thereby protecting the surfaces from contamination and soiling from pet waste, soiled pet litter and/or other materials and contamination.

FIG. 1E depicts a perspective view of pet litter system 100 of FIG. 1A and FIG. 1B, wherein safety liner 130 may be usable as a disposal bag, and upper portion 131 is closable over a disposable inner box 150, and safety liner 130 may comprise pet litter material, pet waste and a potentially soiled disposable inner box 150 therein. In the example implementation of FIG. 1E, safety liner 130 may be closed using a closure device 134, such as a twist tie. In some implementations, upper portion 131 of safety liner 130 may comprise a closure device such as a draw string.

Returning to FIG. 1B, in some implementations, disposable inner box 150 may comprise a floor 151 and an inner wall 152 forming an open-top inner box of an assembled pet litter system 100 comprising a bottom housing 110 of an outer box. In some implementations, bottom housing 110 and side wall(s) 112 may be configured to be taller than disposable inner box 150 and side wall(s) 152. In this manner, in some implementations, bottom housing 110 and side wall(s) 112 covered by safety liner 130, may safely capture and retain pet litter and pet waste which may be expelled or otherwise kicked (knocked, etc.) and/or disposed outside of disposable inner box 150. In various implementations, the perimeter of floor 151 may be of various shapes, such as for example, a rectangle (as depicted in FIG. 1A and FIG. 1B), an oval, an ellipse, a square, and the like, and inner wall 152 may follow the perimeter shape of floor 151. Bottom housing 110 and disposable inner box 150 may have cooperating shapes and be configured such that disposable inner box 150 may be installed within bottom housing 110 having a safety liner 130 installed therein and may be removed from bottom housing 110 via safety liner 130, wherein bottom housing 110 and disposable inner box 150 may have cooperative perimeter shapes and may be sized and configured to provide a service gap 170 therebetween.

In some implementations, disposable inner box 150 may be comprised of a pet-safe non-toxic biodegradable and/or a pet-safe non-toxic compostable material, such as by way of example, a water resistant corrugated paper based product which has been treated with a resistant coating. One example of such a resistant coating is Liquiguard coating manufactured by GWP Group, Unit 20 Chelworth Park, Cricklade, Swindon, SN6 6HE, Great Britain. A corrugated paper based product which has been so treated may be manipulated and processed by a variety of ways to form a disposable inner box 150, such as, by cutting, creasing, folding, embossing, stamping, pressing, gluing, interlocking tabs and slots, taping, and/or the like.

In some implementations, safety liner 130 may be comprised of a pet-safe non-toxic biodegradable and/or a pet-safe non-toxic compostable material, such as a biopolymer. One example of such a biopolymer is Ecovio® manufactured by BASF Corporation. When both safety liner 130 and disposable inner box 150 are comprised of pet-safe non-toxic biodegradable and/or pet-safe non-toxic compostable materials, a pet-safe non-toxic biodegradable and/or pet-safe non-toxic compostable pet litter may be used, and as such, the safety liner 130 can be safely sealed around used pet litter, pet waste and a potentially soiled disposable inner box 150, and the total thereof can then be disposed of or composted in an ecologically respectful manner.

Figure 2A:
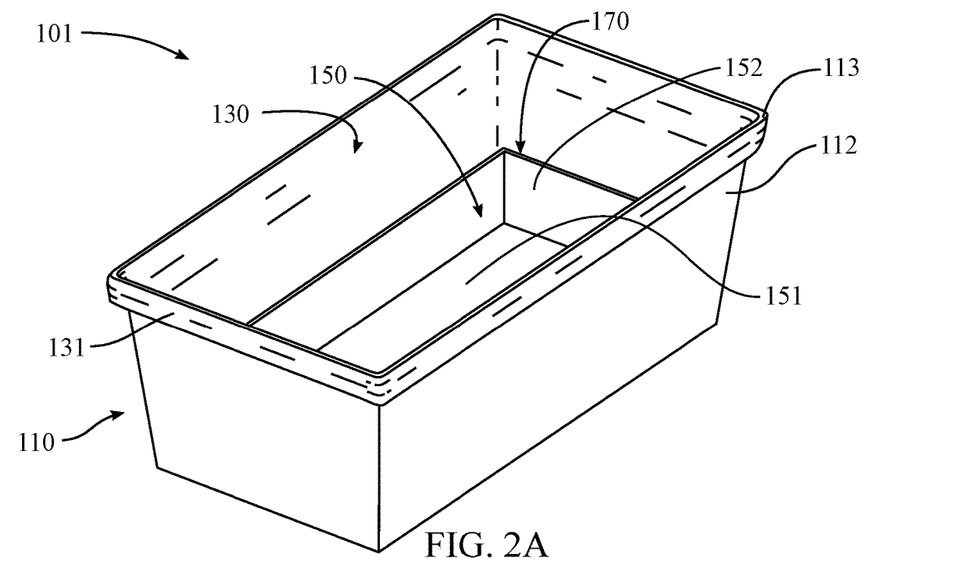
FIG. 2A depicts a perspective view of an implementation of a pet litter system.
Figure 2B:
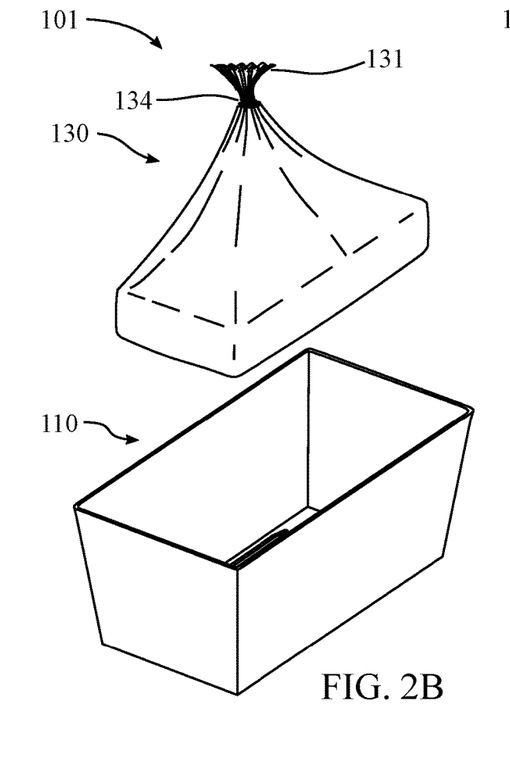
FIG. 2B depicts a perspective view of the pet litter system of FIG. 2A.

In some implementations, a bottom housing 110 and safety liner 130 may be configured to be suitable for pets including pets having poorly controlled waste excretions (such as an elderly and/or sick pet). FIG. 2A depicts a perspective view of an example implementation of a pet litter system 101 suitable for pets including pets having poorly controlled waste excretions. In the example implementation of FIG. 2A, pet litter system 101 comprises a tall enclosing wall 112 (may be called "tall version"), such that a safety liner 130 may cover interior surfaces of tall enclosing wall 112 and an upper portion 131 of safety liner 130 may be positioned outside of an elevated perimeter edge 113, and a pet having poorly controlled waste excretions (such as an elderly and/or sick pet) may use pet litter system 101 to dispose pet waste therein and will not be prone to excrete waste on the uppermost portions of tall enclosing wall 112 and adjacent portions of a covering safety liner 130, upper portion 131, and/or outside of bottom housing 110. A safety liner 130 configured for use in pet litter system 101 may comprise a taller compliant wall 133 (may be called "tall version") than that of pet litter system 100 and, as such, when used as a disposable bag, the disposable bag may comprise a taller profile (may be called "tall profile version"). FIG. 2B depicts a perspective view of pet litter system 101 of FIG. 2A, wherein a tall version of safety liner 130 is used as a tall profile version disposal bag and comprises a taller profiler than that of the disposable bag of pet litter system 100 depicted in FIG. 1E.

Figure 2C:
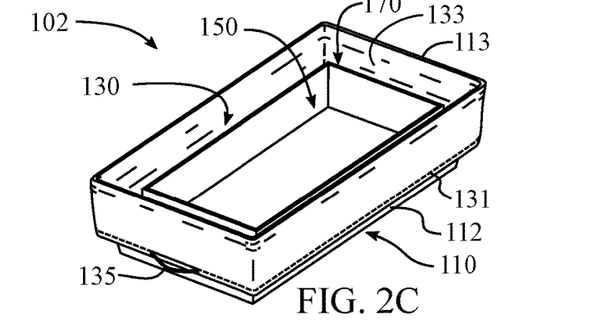
FIG. 2C depicts a perspective view of an implementation of a pet litter system having a safety liner comprising a draw string closure device.
Figure 2D:
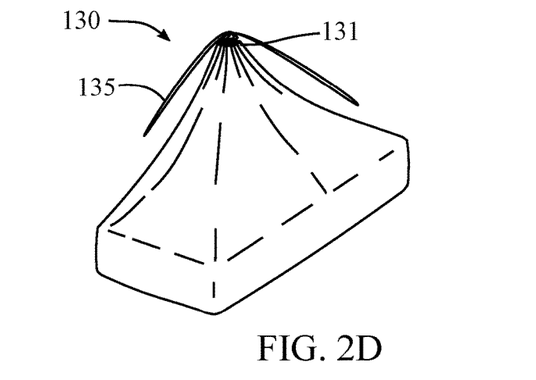
FIG. 2D depicts a perspective view of an implementation of a safety liner of the pet litter system of FIG. 2C.

In some implementations, a safety liner 130 may have a taller height of a compliant wall 133 (see FIG. 1B, wherein the height of complaint wall 133 may be a distance between compliant floor 132 and a top edge of upper portion 131) than that depicted in FIG. 1B, wherein when safety liner 130 is installed within bottom housing 110, top portion 131 may wrap over top edge 113 and extend a further distance downward adjacent to the exterior surface of enclosing wall 112, as can be seen in example implementation of a pet litter system 102 depicted in FIG. 2C having a taller height compliant wall 133 than that of pet litter system 100 of FIG. 1A. A safety liner 130, a bottom housing 110 of pet litter system 101 (FIG. 2A) and a bottom housing 110 of pet litter system 102 may be configured such that a tall version safety liner 130 may be used in both pet litter system 102 and pet litter system 101 (tall version). By way of example only, the example implementation of safety liner 130 of FIG. 2C is depicted illustrating an upper portion 131 comprising a draw string 135 closure device as may be used in some implementations. FIG. 2D depicts a perspective view of a tall version safety liner 130 of system 102 of FIG. 2C used as a tall profile version disposal bag, and upper portion 131 is closed over a disposable inner box 150, and tall version safety liner 130 may comprise pet litter material, pet waste and a potentially soiled disposable inner box 150 therein. In the example implementation of FIG. 2D, upper portion 131 of tall version safety liner 130 may comprise a closure device such as a draw string 135 and safety liner 130 may be closed therewith as depicted in FIG. 2D.

Figure 3A:
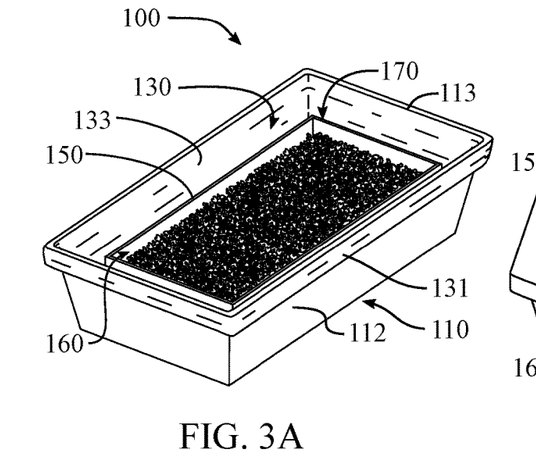
FIG. 3A depicts a perspective view of an implementation of the pet litter system of FIG. 1A.
Figure 3B:
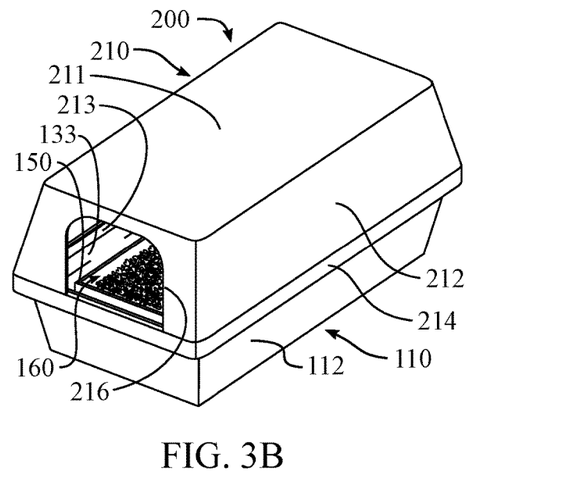
FIG. 3B depicts a perspective view of an implementation of a pet litter system of FIG. 1A.
Figure 4A:
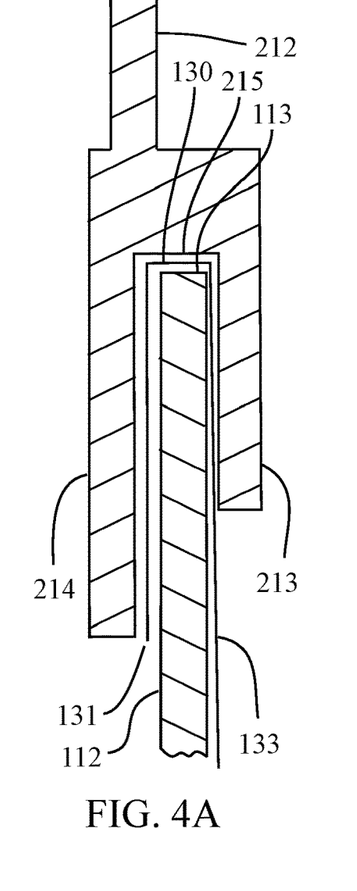
FIG. 4A depicts a cross section of an implementation of a safety liner captured between a top edge of an enclosing wall of a bottom housing and a top housing.

In some implementations, pet litter systems, such as example pet litter systems 100, 101 and 102, of FIG. 1A, FIG. 2A and FIG. 2C, respectively, may further comprise a top enclosure, and as such, pet litter and pet waste therein may be less exposed to areas surrounding the systems. An enclosed top may reduce potential odors and reduce potential unsanitary contamination of surrounding areas. FIG. 3A depicts a perspective view of an example implementation of a pet litter system 100 having pet litter 160 disposed in disposable inner box 150 and not comprising a top housing; FIG. 3B depicts a perspective view of an example implementation of a pet litter system 200 similar to pet litter system 100 having pet litter 160 disposed in disposable inner box 150 and comprising a top housing 210 enclosing the top of pet litter system 200. Top housing 210 depicted in FIG. 3B comprises a top wall 211 and a perimeter side wall(s) 212 and may be a side entry top housing 210 comprising an entryway 216 in a perimeter side wall 212 of top housing 210. In some implementations, the bottom of perimeter side wall 212 may comprise an outer flange 214 and an inner flange 213, which may collectively form a groove within the bottom of perimeter side wall 212. The groove within the bottom of perimeter side wall 212 may be configured to mate with top edge 113 (see FIG. 3A) of enclosing wall 112 of bottom housing 110. In some implementations, safety liner 130 may be captured between top edge 113 of enclosing wall 112 and within the groove formed by outer flange 214 and an inner flange 213 within the bottom of perimeter side wall 212 as depicted in FIG. 4A. FIG. 4A depicts one implementation of a cross section of safety liner 130 captured between top edge 113 of enclosing wall 112 and within a groove 215 formed by outer flange 214 and inner flange 213 within the bottom of perimeter side wall 212. In some implementations, upper portion 131 of safety liner 130 is adjacent to an exterior surface of enclosing wall 112 and protected from contamination by pet waste and soiled litter by a mating of groove 215 of perimeter side wall 212 of top housing and top edge 113 of enclosing wall 112 of bottom housing 110.

Figure 3C:
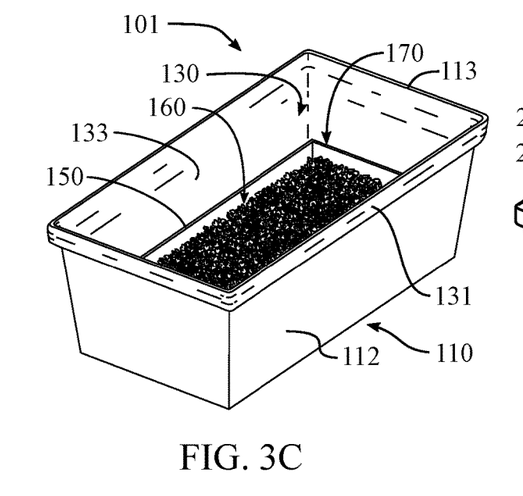
FIG. 3C depicts a perspective view of an implementation of the pet litter system of FIG. 2A.
Figure 3D:
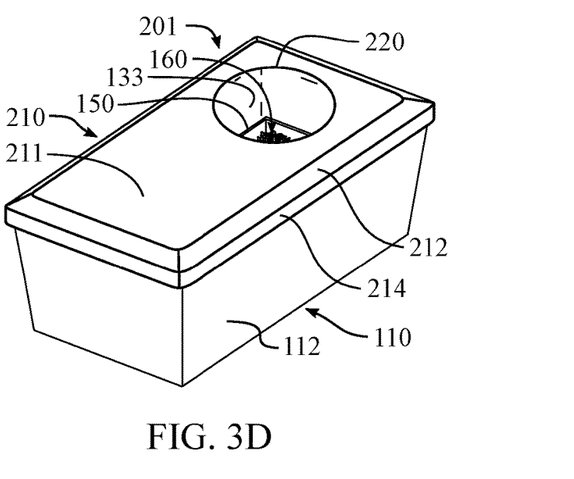
FIG. 3D depicts a perspective view of an implementation of a pet litter system similar to the pet litter system of FIG. 2A.

FIG. 3C depicts a perspective view of an example implementation of a pet litter system 101 (tall version) having pet litter 160 disposed in disposable inner box 150 and not comprising a top housing. FIG. 3D depicts a perspective view of an example implementation of a pet litter system 201 (tall version) similar to pet litter system 101 having pet litter 160 disposed in disposable inner box 150 and comprising a top housing 210 enclosing the top of pet litter system 201. Top housing 210 depicted in FIG. 3D comprises a top wall 211 and a perimeter side wall(s) 212 and may be a top entry top housing 210 comprising an entryway 220 in top wall 211 of top housing 210. A top entry top housing 210 of pet litter system 201 may minimize a likelihood pet litter, pet waste and/or other debris may be expelled or otherwise kicked (knocked, etc.) out of or otherwise deposited outside of pet litter system 201 via an entryway. Top wall 211 may comprise a rough, textured and/or other surface feature to improve a pet's ability to establish a perch on top wall 211 prior to entry or after exit through top entryway 220. In some implementations, the bottom of perimeter side wall 212 may comprise an outer flange 214 and an inner flange 213, which may collectively form a groove 215 within the bottom of perimeter side wall 212. Groove 215 within the bottom of perimeter side wall 212 may be configured to mate with top edge 113 (see FIG. 3C) of enclosing wall 112 of bottom housing 110. In some implementations, safety liner 130 may be captured between top edge 113 of enclosing wall 112 and within groove 215 formed by outer flange 214 and an inner flange 213 within the bottom of perimeter side wall 212 as depicted in FIG. 4A. FIG. 4A depicts a cross section of safety liner 130 captured between top edge 113 of enclosing wall 112 and within a groove 215 formed by outer flange 214 and inner flange 213 within the bottom of perimeter side wall 212, wherein upper portion 131 of safety liner 130 is adjacent to an exterior surface of enclosing wall 112 and protected from contamination by pet waste and soiled litter by a mating of groove 215 of perimeter side wall 212 of top housing and top edge 113 of enclosing wall 112 of bottom housing 110.

Figure 3E:
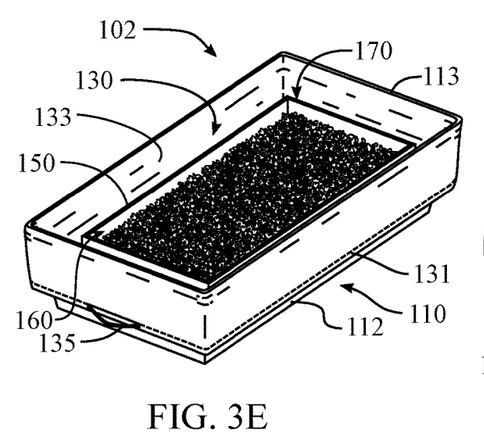
FIG. 3E depicts a perspective view of an implementation of the pet litter system of FIG. 2C.
Figure 3F:
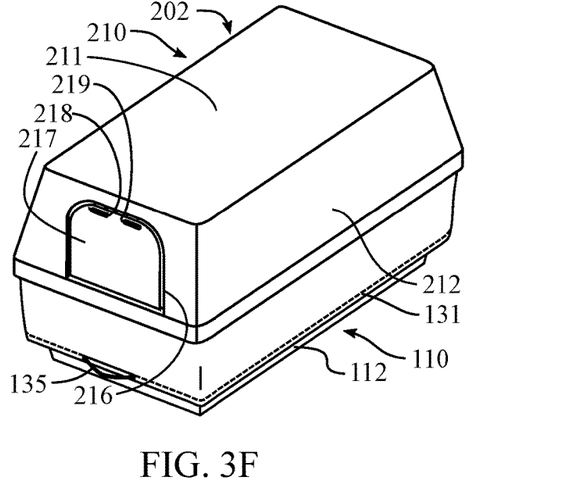
FIG. 3F depicts a perspective view of an implementation of a pet litter system similar to the pet litter system of FIG. 2C.
Figure 4B:
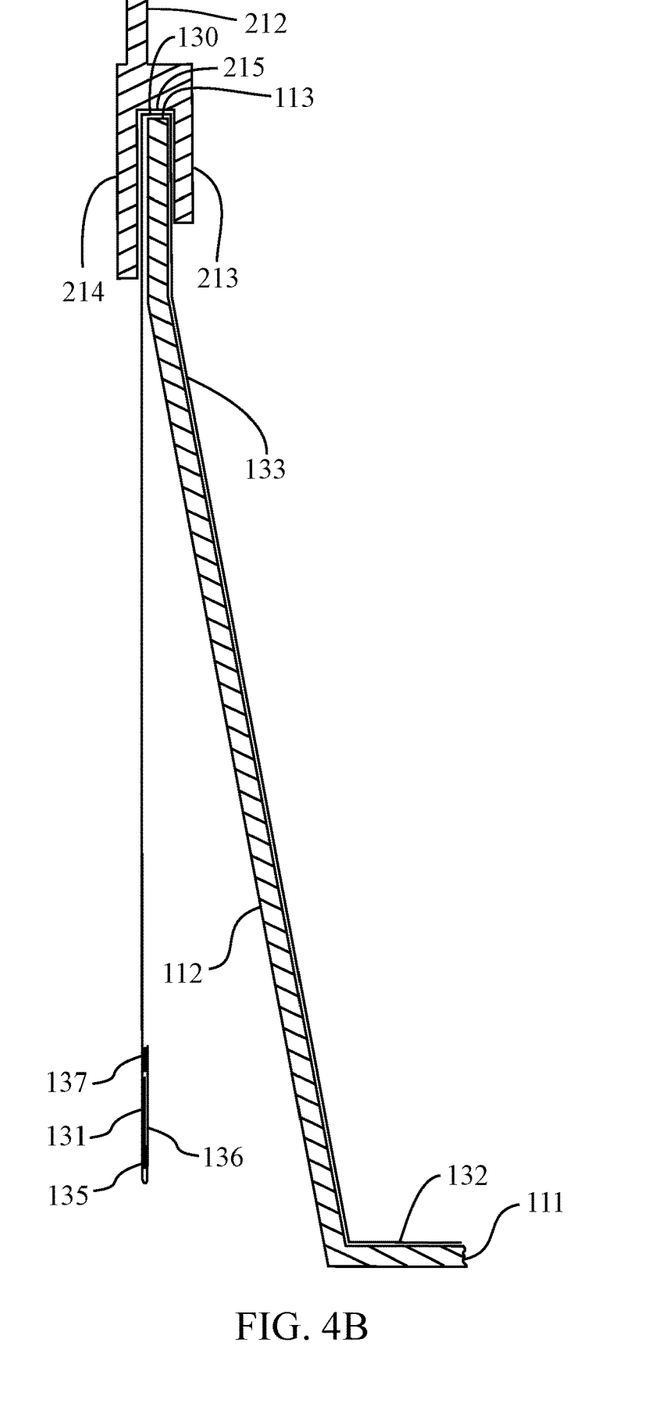
FIG. 4B depicts a cross section of and implementation of a safety liner captured between a top edge of an enclosing wall of a bottom housing and a top housing.

FIG. 3E depicts a perspective view of an example implementation of a pet litter system 102 (tall version) having pet litter disposed in disposable inner box 150 and not comprising a top housing; FIG. 3F depicts a perspective view of an example implementation of a pet litter system 202 (tall version) similar to pet litter system 102 which may have pet litter disposed in disposable inner box 150 (not visible in FIG. 3F) and comprising a top housing 210 enclosing the top of pet litter system 202. Top housing 210 depicted in FIG. 3F comprises a top wall 211 and a perimeter side wall(s) 212 and may be a side entry top housing 210 comprising an entryway 216 in perimeter side wall 212 of top housing 210. Top housing 210 comprises a door flap 217 which, when at rest (e.g., no force is applied), hangs in a vertical orientation within entryway 216 via slots 218 comprised in a top portion of door flap 217, wherein slots 218 hang on hooks 219 comprised by top housing 210 at a top of entryway 216. A pet entering pet litter system 202 comprising door flap 217 may push door flap 217 inward to gain entry. A pet exiting a pet litter system 202 comprising door flap 217 may push door flap 217 outward to exit. In some implementations, the bottom of perimeter side wall 212 may comprise an outer flange 214 and an inner flange 213, which may collectively form a groove 215 within the bottom of perimeter side wall 212. Groove 215 within the bottom of perimeter side wall 212 may be configured to mate with top edge 113 (see FIG. 3E) of enclosing wall 112 of bottom housing 110. In some implementations, safety liner 130 may be captured between top edge 113 of enclosing wall 112 and within groove 215 formed by outer flange 214 and an inner flange 213 within the bottom of perimeter side wall 212 as depicted in FIG. 4B. FIG. 4B depicts a cross section of safety liner 130 captured between top edge 113 of enclosing wall 112 and within a groove 215 formed by outer flange 214 and inner flange 213 within the bottom of perimeter side wall 212, wherein upper portion 131 of safety liner 130 is adjacent to an exterior surface of enclosing wall 112 and protected from contamination by pet waste and soiled litter by a mating of groove 215 of perimeter side wall 212 of top housing and top edge 113 of enclosing wall 112 of bottom housing 110. In some implementations, wall 112 extends upwardly from base 111 at an outward angle from vertical, as illustrated in FIG. 4B. It should be appreciated that wall 112 could be constructed vertically (e.g., creating a 90 degree angle in relation to base 111) or at another suitable outward angle from vertical. In the example implementation of FIG. 4B, upper portion 131 of safety liner 130 of FIG. 4B comprises a draw string 135 within an envelope formed by a fold 136 and an attachment 137, wherein attachment 137 may be accomplished in various ways, such as, an adhesive attachment and/or a thermal fusing, and draw string 135 may be used as depicted in FIG. 2D as a closure device.

Although not illustrated, it should be appreciated that in some implementations, top housing 210 (e.g., as illustrated in FIG. 3B, 3D, or 3F) may additionally include a knob, handle, or other protrusion disposed thereon to facilitate safe removal of top housing 210 for servicing of the pet litter system.

Figure 3G:
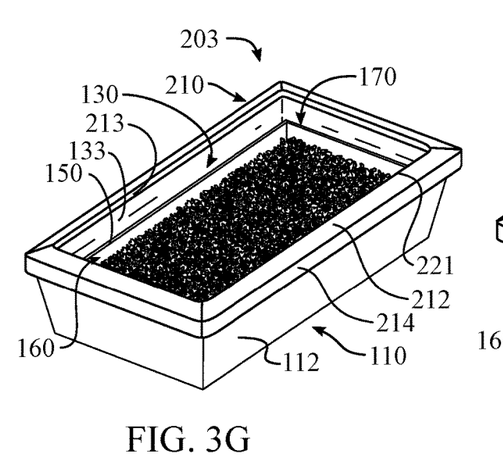
FIG. 3G depicts a perspective view of an implementation of a pet litter system similar to the pet litter system of FIG. 1A.

FIG. 3G depicts a perspective view of an example implementation of a pet litter system 203 similar to pet litter system 100 (of FIG. 3A) having pet litter 160 disposed in disposable inner box 150 and comprising a top housing 210 having a substantially open-top of pet litter system 203, and providing a capturing of safety liner 130 between bottom housing 110 and top housing 210. In some implementations, top housing 210 depicted in FIG. 3G comprises a perimeter side wall(s) 212 having an inner perimeter which defines a substantially open top which may be used as an entryway and a service access opening 221 of top housing 210 by a pet to access pet litter system 203 and a servicer to service and extend the service life of pet litter within pet litter system 203, respectively. In some implementations, the bottom of perimeter side wall 212 may comprise an outer flange 214 and an inner flange 213, which may collectively form a groove within the bottom of perimeter side wall 212. In some implementations, the groove within the bottom of perimeter side wall 212 may be configured to mate with top edge 113 (see FIG. 3A) of enclosing wall 112 of bottom housing 110. In some implementations, safety liner 130 may be captured between top edge 113 of enclosing wall 112 and within the groove formed by outer flange 214 and an inner flange 213 within the bottom of perimeter side wall 212 as depicted in FIG. 4A. FIG. 4A depicts a cross section of safety liner 130 captured between top edge 113 of enclosing wall 112 and within a groove 215 formed by outer flange 214 and inner flange 213 within the bottom of perimeter side wall 212, wherein upper portion 131 of safety liner 130 is adjacent to an exterior surface of enclosing wall 112 and protected from contamination by pet waste and soiled litter by a mating of groove 215 of perimeter side wall 212 of top housing and top edge 113 of enclosing wall 112 of bottom housing 110.

Figure 3H:
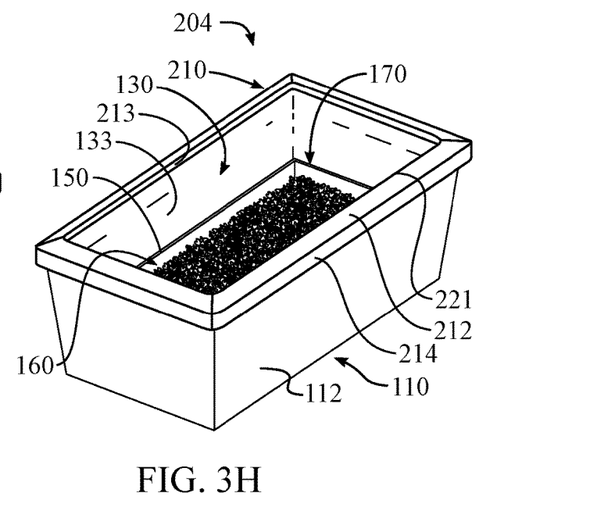
FIG. 3H depicts a perspective view of an implementation of a pet litter system similar to the pet litter system of FIG. 2A.

FIG. 3H depicts a perspective view of an example implementation of a pet litter system 204 similar to pet litter system 101 (of FIG. 3C) (tall version) having pet litter 160 disposed in disposable inner box 150 and comprising a top housing 210 having a substantially open-top of pet litter system 204, and providing a capturing of safety liner 130 between bottom housing 110 and top housing 210. In some implementations, top housing 210 depicted in FIG. 3H comprises a perimeter side wall(s) 212 having an inner perimeter which defines a substantially open top which may be used as an entryway and a service access opening 221 of top housing 210 by a pet to access pet litter system 203 and a servicer to service and extend the service life of pet litter within pet litter system 203, respectively. In some implementations, the bottom of perimeter side wall 212 may comprise an outer flange 214 and an inner flange 213, which may collectively form a groove within the bottom of perimeter side wall 212. The groove within the bottom of perimeter side wall 212 may be configured to mate with top edge 113 (see FIG. 3C) of enclosing wall 112 of bottom housing 110. In some implementations, safety liner 130 may be captured between top edge 113 of enclosing wall 112 and within the groove formed by outer flange 214 and an inner flange 213 within the bottom of perimeter side wall 212 as depicted in FIG. 4A. FIG. 4A depicts a cross section of safety liner 130 captured between top edge 113 of enclosing wall 112 and within a groove 215 formed by outer flange 214 and inner flange 213 within the bottom of perimeter side wall 212, wherein upper portion 131 of safety liner 130 is adjacent to an exterior surface of enclosing wall 112 and protected from contamination by pet waste and soiled litter by a mating of groove 215 of perimeter side wall 212 of top housing and top edge 113 of enclosing wall 112 of bottom housing 110.

Top housings 210 of pet litter systems 200, 201, 202, 203 and 204 may be rigid or semi-rigid and may be manufactured using various materials and processes. For example, in some implementations, top housings 210 may be made of plastics using a thermal forming process, such as for example, injection molding or thermoforming, and various plastic materials, thicknesses and other geometries may be used and may offer various rigidities. In some implementations, metals, woods, chips, fibers, resins, epoxies, glues, composite materials and/or other suitable materials may be used. In some implementations ceramics and glass may be used, however caution against breakage and potential injuries resulting from sharp edges should be taken.

In some implementations, the height of enclosing wall 112 of bottom housing 110 of pet litter systems 100, 101, 102, 200, 201, 202, 203, and 204 is greater than the height of side wall 152 of inner box 150. In some implementations, the height of enclosing wall 112 is at least twice the height of side wall 152. In some implementations, the height of enclosing wall 112 may be 3× (e.g., three times) to 5× or greater than the height of side wall 152. Further, in some implementations, the pet litter systems 100, 101, 102, 200, 201, 202, 203, and 204 described herein may be manufactured in a variety of sizes (e.g., small, medium, large, extra-large) to accommodate a variety of pet sizes or plurality of pets.

A pet litter system of the present disclosure provides a servicer of the pet litter system (such as a pet owner) a convenient and sanitary system and method for servicing the pet litter system. In some implementations, a servicer of a pet litter system may prepare the pet litter system for use by: 1) installing a safety liner 130 in bottom housing 110, wherein an upper portion 131 of safety liner 130 is configured such that it is not prone to contamination by pet waste and soiled litter (e.g., may be positioned outside of the perimeter of bottom housing 110); 2) installing a disposable inner box 150 within bottom housing 110 and on top of safety liner 130, such that safety liner 130 separates interior surfaces of bottom housing 110 from disposable inner box 150, and disposable inner box 150 and bottom housing 110 may comprise a service gap 170; 3) disposing pet litter in disposable inner box 150 (or disposable inner box 150 may be prefilled with pet litter), wherein a pet using the pet litter to dispose waste therein is separated from safety liner 130 by disposable inner box 150; and 4) optionally installing, an optional top housing 210 on top of the bottom housing 110 forming an optional top enclosure for the bottom housing, wherein an upper portion 131 of safety liner 130 may pass in between the bottom housing 110 and the optional top housing 210 and be protected from contamination by pet waste and soiled litter disposed within the bottom housing 110 and the optional top housing 210.

In some implementations, a servicer of a pet litter system may extend the service life of pet litter within a pet litter system by: 1) removing, if installed, an optional top housing 210 optionally installed on top of a bottom housing 110; 2) scooping pet waste from pet litter which may be present within a disposable inner box 150, wherein scooped pet waste may be removed from the pet litter system for disposal or may be disposed in a service gap 170, if present, and a gap size of a present service gap 170 is of a large enough size to accommodate the scooped pet waste; 3) if a service gap 170 is present and pet waste is disposed therein, optionally disposing pet litter in service gap 170 to cover the pet waste disposed therein, thereby controlling odor; and 4) replacing if present, a removed optional top housing 210, wherein an upper portion 131 of safety liner 130 may pass in between bottom housing 110 and optional top housing 210 and be protected from contamination by pet waste and soiled litter disposed within the bottom housing 110 and optional top housing 210.

In some implementations, a servicer of a pet litter system may service the pet litter system to quickly remove all pet litter, all pet waste and all soiled system components therein for disposal, thereby quickly and fully removing all sources of odor, and then prepare the pet litter system for subsequent use by: 1) removing, if installed, an optional top housing 210 optionally installed on top of a bottom housing 110; 2) grasping an upper portion 131 of a safety liner 130 configured such that it is not prone to contamination by pet waste and soiled litter (e.g., may be positioned outside of a perimeter of bottom housing 110); 3) closing safety liner 130, wherein safety liner 130 is configured to be used as a disposal bag, thereby sealing contents therein, and wherein such contents may include a disposable inner box 150, pet litter and pet waste; 4) safely removing the disposal bag (e.g., closed safety liner 130) and its contents for disposal thereof 5) installing a clean safety liner 130 in bottom housing 110, wherein an upper portion 131 of safety liner 130 is configured such that it is not prone to contamination by pet waste and soiled litter (e.g., may be positioned outside of a perimeter of bottom housing 110); 6) installing a disposable inner box 150 within bottom housing 110 and on top of safety liner 130, such that safety liner 130 separates interior surfaces of bottom housing 110 from disposable inner box 150, and disposable inner box 150 and bottom housing 110 may comprise a service gap 170; 7) disposing pet litter in disposable inner box 150 (or disposable inner box 150 may be prefilled with pet litter), wherein a pet using the pet litter to dispose waste therein is separated from safety liner 130 by disposable inner box 150; and 8) replacing if present, a removed optional top housing 210, wherein an upper portion 131 of safety liner 130 may pass in between bottom housing 110 and optional top housing 210 and be protected from contamination by pet waste and soiled litter disposed within bottom housing 110 and optional top housing 210.

In some implementations, a safety liner 130 and a disposable inner box 150 may be sold as accessories to service and maintain a pet litter system. In some implementations, a safety liner 130 and a disposable inner box 150 may attached together and be configured to be installed in a bottom housing 110 as a service unit, where, when attached, safety liner 130 may be properly positioned to cover the interior surfaces of bottom housing 110. In some implementations, disposable inner box 150 may further be attached thereto safety liner 130 and is thereby properly located within bottom housing 110. In some implementations, where a disposable inner box 150 may be properly located by an attachment to a properly positioned safety liner 130, location features 114, and any cooperating placement features 153, may be redundant.

Figure 5A:
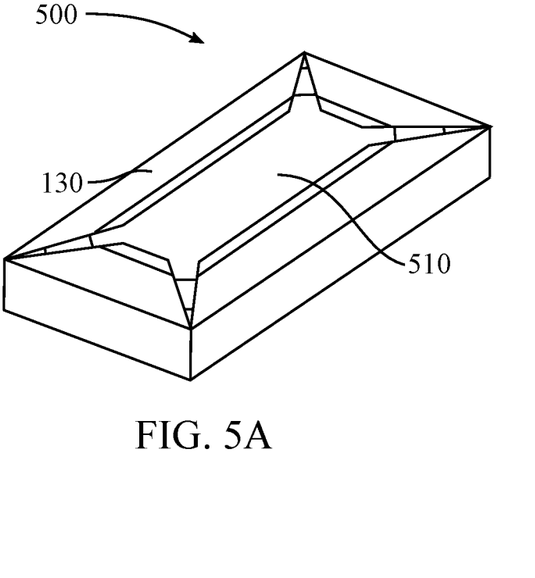
FIG. 5A depicts a perspective view of an implementation of a prepackaged service unit.
Figure 5B:
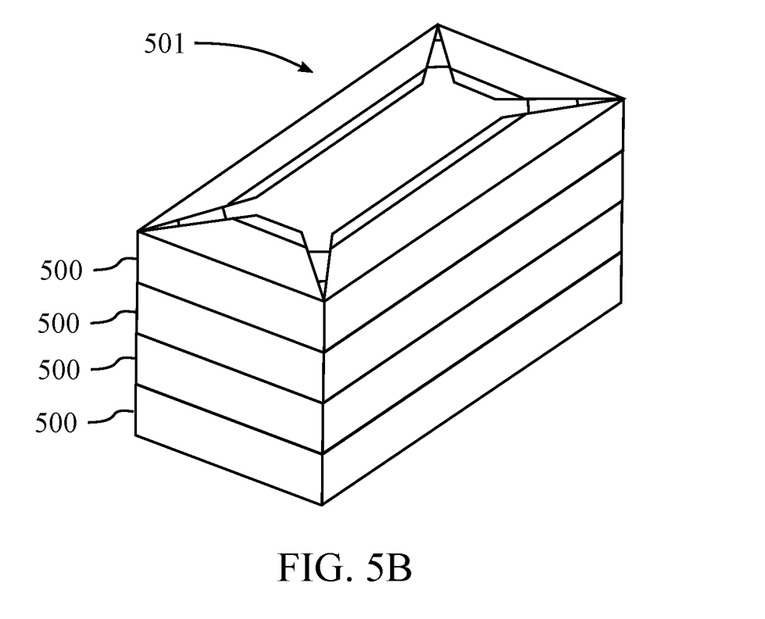
FIG. 5B depicts a perspective view of an implementation of a stack of a plurality of prepackaged service units.

In some implementations, the service unit may be sold as an accessory to service and maintain a pet litter system. In some implementations, a safety liner 130, disposable inner box 150 and pet litter may be prepackaged as a prepackaged service unit by a manufacturer and/or distributor. FIG. 5A depicts a perspective view of an example implementation of a prepackaged service unit 500. Prepackaged service unit 500 may comprise a disposable inner box 150 prefilled with pet litter (box and litter not visible in FIG. 5A), within a folded safety liner 130. In some implementations, prepackaged service unit 500 may comprise a cover 510 situated over pet litter within disposable inner box 150 to assist in retaining pet litter therein and to provide support for safety liner material folded onto a top area of prepackaged service unit 500. In some implementations, prepackaged service units may be stackable for shipment, handling, storage and the like. FIG. 5B depicts a perspective view of a stack of prepackaged service units 501, comprising a stack of four prepackaged service units 500. In some implementations, a prepackaged service unit 500 may comprise surplus pet litter to dispose into a service gap 170. In some implementations a prepackaged service unit 500 may be sold as an accessory to service and maintain a pet litter system. In some implementations, accessory safety liners 130, accessory disposable inner boxes 150, accessory service units and/or accessory prepackaged service units 500 may be provided as part of a paid subscription service. For example, a servicer of a pet litter system may enroll in a paid subscription service and receive on a periodic and/or request basis accessories shipped to the servicer, wherein such accessories may be one or more of safety liners 130, accessory disposable inner boxes 150, accessory service units and/or accessory prepackaged service units 500. In some implementations, the accessory safety liners, accessory disposable inner boxes, and pet litter may be separately sold.

As can be appreciated, implementations of a pet litter system and method of servicing as described herein provide numerous advantages and efficiencies. The pet litter system and method of servicing described herein may provide easy and sanitary servicing of and disposal of soiled pet litter and may accommodate a pet having poorly controlled waste excretions (such as an elderly and/or sick pet) may be prone to excrete or "spray" waste material uncontrollably. Further, a servicer of the herein described pet litter system and method of servicing may easily and quickly service a soiled litter box with no contact of potentially soiled surfaces, thereby increasing pet litter servicing safety and reducing potential exposure to unsanitary surfaces which may convey parasites (e.g., toxoplasmosis) or other infection to the servicer.

A number of implementations of pet litter systems and methods for servicing the systems have been described. Various modifications may be made without departing from the spirit and scope of the disclosed pet litter systems and methods.

The present disclosure is not to be limited in terms of the particular implementations described in this application, which are intended as illustrations of various aspects. More-over, the various disclosed implementations can be interchangeably used with each other, unless otherwise noted. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular implementations only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations of pet litter systems and methods of servicing the systems have been described. Various modifications may be made without departing from the spirit and scope of the disclosure.

What is claimed is:

1. A pet litter servicing system comprising:
   a bottom housing comprising a base and an enclosing wall; and
   a service unit comprising:
      a safety liner receivable by the bottom housing and extending to cover the enclosing wall;
      an inner box comprising a floor and an inner wall;
   wherein the safety liner separates the inner box from the base; and
   a height of the enclosing wall is greater than a height of the inner wall.

2. The pet litter servicing system of claim 1 wherein said service unit includes the inner box disposed within the safety liner.

3. The pet litter servicing system of claim 2 wherein the service unit further comprises pet litter contained within the inner box, and the inner box further comprises a removable cover for retaining pet litter therein.

4. The pet litter servicing system of claim 1 further comprising a service gap disposed between the enclosing wall of the bottom housing and the inner wall of the inner box.

5. The pet litter servicing system of claim 4 wherein an area of the base is greater than an area of the floor.

6. The pet litter servicing system of claim 1 wherein the safety liner further comprises an upper portion and wherein the upper portion extends outside a perimeter of the enclosing wall.

7. The pet litter servicing system of claim 6 wherein the safety liner further comprises a draw string closure disposed along the upper portion.

8. A method of servicing a pet litter system including a bottom housing having a base and an enclosing wall and a service unit having an inner box comprising a floor and an inner wall and a safety liner, wherein an area of the base is greater than an area of the floor and a height of the enclosing wall is greater than a height of the inner wall, the method comprising:
   installing the service unit within the bottom housing; and
   removing the service unit from the bottom housing.

9. The method of servicing a pet litter system of claim 8 wherein the step of installing the service unit further comprising:
   installing a safety liner within the bottom housing where the safety liner is installed to cover the base and the enclosing wall; and
   positioning the inner box within the bottom housing and on top of the safety liner.

10. The method of servicing a pet litter system of claim 9 wherein the safety liner further comprises an upper portion, the method further comprising:
 extending the upper portion outside a perimeter of the enclosing wall.

11. The method of servicing a pet litter system of claim 10 wherein service unit further comprises pet litter contained within the inner box and an inner box cover for retaining the pet litter within the inner box, the step of installing the service unit further comprising:
 removing the inner box cover to expose the pet litter.

12. The method of servicing a pet litter system of claim 8 wherein the safety liner further comprises an upper portion and the step of removing the service unit further comprising:
 grasping the upper portion of the safety liner; and
 closing the safety liner, including the inner box and pet litter, where the safety liner is configured to be used as a disposal bag.

13. The method of servicing a pet litter system of claim 12, wherein the upper portion of the safety liner includes a draw string and wherein the step of closing the safety liner further comprises:
 pulling the draw string.

14. A method of providing a subscription service for a pet litter servicing system including a bottom housing having a base and an enclosing wall and a service unit having an inner box comprising a floor and an inner wall and a safety liner, wherein an area of the base is greater than an area of the floor and a height of the enclosing wall is greater than a height of the inner wall, the method comprising:
 receiving an enrollment from a servicer of the pet litter servicing system, wherein the enrollment specifies a request for one or more service units and a manner of payment;
 arranging the one or more service units into an accessory prepackaged service unit; and
 shipping, to the servicer, the requested accessory prepackaged unit.

15. The method of providing a subscription service for a pet litter servicing system of claim 14, further comprising:
 periodically shipping to the servicer the requested accessory prepackaged unit when the enrolment from a servicer of the pet litter servicing system specifies a periodic recurrent request for one or more service units.

\* \* \* \* \*